No. 829,115. PATENTED AUG. 21, 1906.
G. E. LUCE.
BRICK MACHINE.
APPLICATION FILED AUG. 26, 1905.

Witnesses:
Inventor:
Grafton E. Luce
By Thomas F. Sheridan,
Atty.

No. 829,115. PATENTED AUG. 21, 1906.
G. E. LUCE.
BRICK MACHINE.
APPLICATION FILED AUG. 26, 1905.
6 SHEETS—SHEET 2.

Fig. 2

Witnesses:
Inventor:
Grafton E. Luce,
By Thomas F. Sheridan,
Atty.

No. 829,115. PATENTED AUG. 21, 1906.
G. E. LUCE.
BRICK MACHINE.
APPLICATION FILED AUG. 26, 1905.
6 SHEETS—SHEET 3.

Fig. 3.

Witnesses:
Inventor:
Grafton E. Luce,
By Thomas F. Sheridan,
Atty.

No. 829,115. PATENTED AUG. 21, 1906.
G. E. LUCE.
BRICK MACHINE.
APPLICATION FILED AUG. 26, 1905.

Witnesses:
Chas. L. Gaylord.
John Enders.

Inventor:
Grafton E. Luce,
By Thomas F. Sheridan,
Atty.

THE NORRIS PETERS CO., WASHINGTON, D. C.

UNITED STATES PATENT OFFICE.

GRAFTON E. LUCE, OF CHICAGO, ILLINOIS.

BRICK-MACHINE.

No. 829,115.  Specification of Letters Patent.  Patented Aug. 21, 1906.

Application filed August 26, 1905. Serial No. 275,930.

*To all whom it may concern:*

Be it known that I, GRAFTON E. LUCE, a citizen of the United States, residing at Chicago, in the county of Cook and State of Illinois, have invented certain new and useful Improvements in Brick-Machines, of which the following is a specification.

My invention relates to that class of brick-machines having a movable cutting-table or carriage and rotatable cutting-reel and means for rotating the cutting-reel during the movement of the carriage or table.

It relates particularly to the means for operating the cutting-reel and movable table or carriage.

The principal object of the invention is to provide a simple, economical, and efficient brick-machine.

A further object of the invention is to provide in a brick-machine having a movable carriage or cutting-table suitable means for enabling the cutting-table to be moved with and by means of the column of clay in one direction and returned to initial position by mechanism operating independently of the clay in combination with means for holding the cutting-table in initial position and automatically releasing it at the instant the column of clay has reached a predetermined point in its movement with relation to such cutting-table.

A further object of the invention is to provide in a machine having a cutting-table movable with a column of clay and a rotary cutting-reel mounted upon and movable therewith suitable means for moving the cutting-reel by means of driving mechanism positively actuated during the operative engagement of such cutting-reel with the clay.

A further object of the invention is to provide, in combination, means for enabling the cutting-table to be released at the proper instant and to be moved by and with the column of clay, means for enabling the rotary cutter to be rotated by the column of clay while out of cutting engagement therewith, means for enabling the rotary cutting-reel to be automatically thrown into operative engagement with positively-actuated driving mechanism, positively driven thereby while in cutting engagement with the clay, and automatically released from operative engagement with such positively-actuated driving mechanism, and means for enabling the table to be returned by positively-actuated driving mechanism to initial position, all in such manner as to dispense with governors and delicately-adjusted stopping and starting mechanisms.

Other and further objects of the invention are to provide simple and efficient means for securing and holding the cutting-wires, simple and efficient platens for supporting the column of clay during the cutting operation and minimizing the friction which accompanies its movement over the platens, such platens being also adapted to prevent the buckling of the clay, and to provide suitable extensible and collapsible shafts for enabling the driving-gears for such shafts to be mounted in fixed relation to one portion thereof and the driven wheels or disks in fixed relation to the other portion and movable with the cutting carriage or table.

Other and further objects of the invention will appear from an examination of the drawings and the following description and claims.

The invention consists in the features, combinations, and details of construction hereinafter described and claimed.

In the accompanying drawings, Fig. 4ª, an enlarged detail sectional view taken on line 4ª of Fig. 4, showing the supporting-rollers and annular grooved track mechanism for supporting the rotary cutting-wheel; Fig. 13, a diagrammatic view illustrating various positions of the cutter-wires and cutting-reel with relation to the column of clay; Fig. 14, a diagrammatic view showing the friction-pulley and the friction-segment or segmental disk for operatively connecting the positively-actuated annular friction pulley or disk with the cutting-reel in the position in which they appear when about to pass out of frictional engagement with each other and also showing the clutch members for turning the segmental disk into engagement with the positively-actuated friction-disk, and Fig. 15 a similar view showing the mechanism illustrated in Fig. 14 as the positively-actuated friction-pulley and segmental friction-disk are entering into frictional engagement.

In constructing a brick-machine in accordance with my improvements I provide a reciprocating carriage or cutting-table having a framework $a$ mounted upon suitable bearing wheels or rollers $b$, such wheels having, preferably, grooved peripheral bearing-surfaces adapted to engage supporting-rails $c$, which have inclined upper surface portions $d$ corresponding to the incline upon the carrying-wheels. The supporting-rails may be formed of I-beams and connected by transverse members or ties $e$ and $f$, and the opposite ends of the frame of the carriage or cutting-table are provided with upper annular portions $g$, the whole framework being strengthened by means of longitudinal top members $h$ and longitudinal side members $i$, which extend from end frame to end frame and are firmly secured thereto. The carrying-wheels of the carriage are mounted upon shafts $j$, the opposite ends of which are journaled in elongated slots $k$, by which means the friction accompanying the reciprocating movements of the carriage or table is minimized.

Figures 4, 4A:
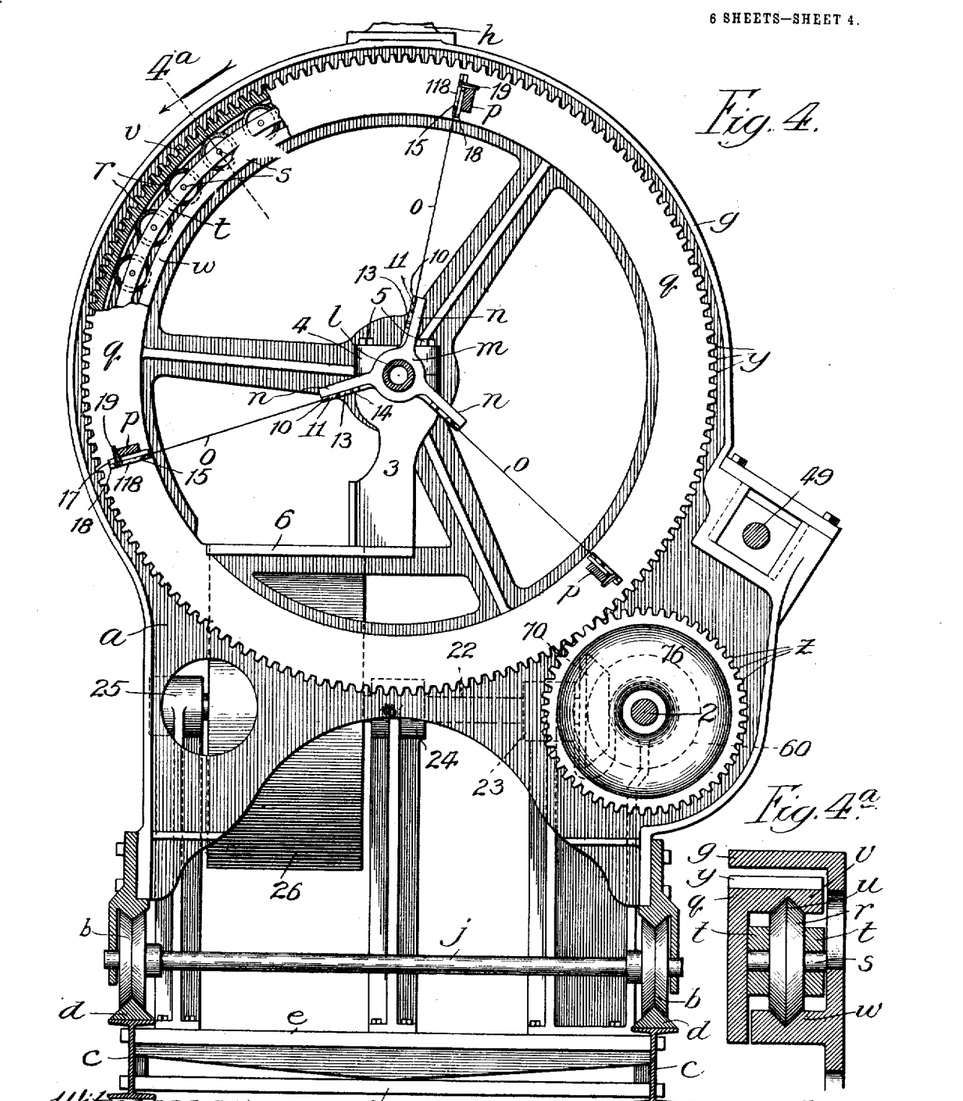
Fig. 4, a sectional elevation taken on line 4 of Fig. 1 looking in the direction of the arrow and showing the manner of mounting the cutting-reel, platens, and cutter-wires.
Figure 5:
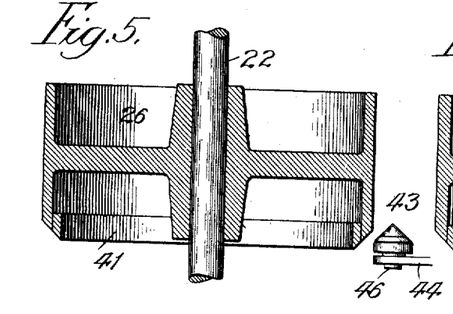
Fig. 5, an enlarged sectional plan view in detail, showing the clay-carrying pulley and means for holding and releasing the movable cutter-table.
Figure 6:
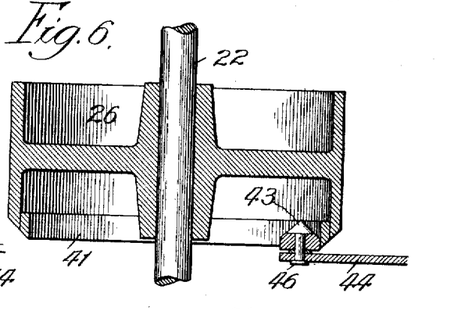
Fig. 6, a similar view showing the table holding and releasing mechanism in position to prevent the movement of the cutting-table.

A hollow supporting-shaft $l$ extends longitudinally and centrally of the table from end to end and is rigidly mounted in end frames, and wire-supporting sleeves or spiders $m$ are mounted upon and loosely encircle such shaft. Each of such sleeves is provided with a plurality of integral wire-supporting arms $n$, extending outward laterally from the sleeve and central shaft and adapted to support the inner ends of cutting-wires $o$. I prefer to employ a plurality of sets of cutting-wires, as shown in Fig. 4, there being here shown three wires for each inner supporting-sleeve and three series of wires in the complete rotary cutting-reel.

A plurality of longitudinally-extending peripheral slats $p$ is provided, one for each series of cutter-wires, and to these slats the outer ends of the cutter-wires are removably secured in the manner hereinafter more particularly described. These slats extend from end to end of the cutting-reel and are secured at their opposite ends to annular disks $q$, having large central or axial open portions adapted to permit the passage of the column of clay therethrough and forming, with the longitudinally-extending peripheral members, a sufficiently-rigid rotatable cutting-reel or reel-framework for carrying the cutting-wires. This reel-frame is rotatably mounted in the reciprocating carriage-framework or cutting-table, being provided at each end with a series of antifriction supporting-rollers $r$, mounted upon trunnions $s$, which are journaled in supporting-rings $t$. These rings are each provided with a multiplicity of perforations forming bearings for the rollers. The rollers have oppositely-inclined peripheral surface portions $u$, adapted to engage the inner annular grooves of the annular flange portions $v$ upon the rotatable end frames of the cutting-reel and similarly-grooved annular supporting-flanges $w$ upon the adjacent end frame portion of the reciprocating carriage-framework in which the reel is rotatably mounted, as shown in Figs. 4 and 4ª. The roller-supporting rings $t$ are mounted upon the opposite sides of each series of the supporting-rollers and between the end frame of the rotatable cutting-reel and the end frame of the carriage, being sufficiently loose to permit the reel to rotate freely, and the annular flanges of the cutting-reel and carriage-framework form suitable bearings for preventing undue longitudinal play of the cutting-reel.

The annular end frame portions of the cutting-reel are each provided with cog-teeth $y$, adapted to engage the teeth of gears $z$, which are mounted upon and in fixed relation to a shaft 2, more particularly hereinafter described, thus enabling the cutting-reel to be rotated, preferably intermittently or in a step-by-step manner by means of such operating-shaft and gear mechanism.

Figures 7, 8, 10:
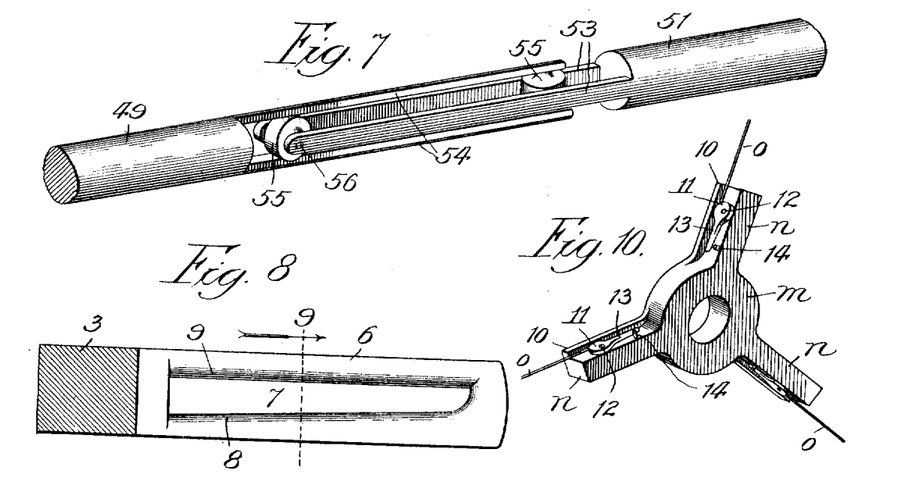
Fig. 7, an enlarged perspective view of the telescope or extensible and collapsible operating-shaft.
Fig. 8, a plan view of the perforated supporting base portion of the platen or platen-section.
Fig. 10, an enlarged detail view of one of the central supports for the cutter-wires, showing the means of connecting the inner ends of the cutter-wires.
Figures 9, 11, 12:
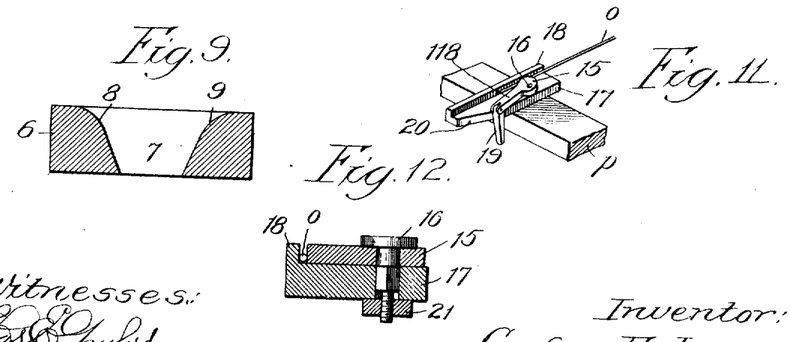
Fig. 9, a sectional elevation taken on line 9 of Fig. 8.
Fig. 11, a perspective detail view of the means for connecting the outer ends of the cutter-wires to the rotatable cutter-reel and for stretching the wires.
Fig. 12, a sectional view of the cam mechanism for securing the ends of the cutter-wires.

It is very desirable to provide platen mechanism adapted to support the column of clay in position to be operated upon by the rotating cutting-reel and also adapted to support the moving clay with the minimum amount of friction, so as to prevent buckling or distortion of the column and increase the uniformity with which it is fed into position to be cut by the cutting-reel. In order to accomplish this, a plurality of supporting-platens or platen-sections 3 are mounted upon and in fixed relation to the non-rotatable hollow shaft 1, being provided with spaces therebetween, through which the cutting-wires of the cutting-wheel pass in cutting the column of clay into sections or bricks. Each of these platen-sections is formed of an upright portion having a supporting-clip 4, which extends over the hollow shaft and is secured to such depending portion by means of bolts 5, so as to securely hold the platen in position. A supporting base portion 6 extends outward from the bottom of the depending supporting portion of each platen at an angle thereto and in a horizontal plane, so as to provide a horizontal support for the column of clay. Each of these base portions is provided with an elongated perforation 7, the side walls 8 and 9 of which are inclined downward and inward, as shown in Figs. 8 and 9, so as to minimize the frictional resistance to the movement of the column of clay upon the platen mechanism and dispense with the use of antifriction-rollers or other movable antifriction devices, which tend to become clogged with clay.

To provide suitable means for removably mounting the cutting-wires and stretching them to necessary tension, as well as to dispense with the necessity of bending the wires into loops and thus weakening them, the inner ends of the wires are mounted between the upper ends of the platen-sections upon the central laterally-extending arms n, already described, which are rotatable upon the non-rotatable central shaft. These inner wire-supporting arms are each provided with a side flange portion 10, which extends laterally or in line with the direction of the wire when in operative position, and a securing and stretching cam 11 is pivotally mounted upon such arm on a pivot 12 and provided with an operating lever-arm 13. A lug or pin 14 is adapted to engage the lever when the cam is in locking position and prevent its movement to releasing position. A similar cam 15 is provided at the outer end of each cutting-wire and rotatably mounted, by means of a pivot 16, upon an angular casting 17, having a securing-flange 18, which extends in line with the cutting-wire when in operative position, such securing-casting being mounted upon the longitudinally-extending peripheral members p of the cutting-reel, already described, which form the outer frame portion of such cutting-reel. These outer securing-cams are each provided with an integral operating-lever portion 118, having a pivoted lever portion 19 pivotally secured thereto and movable into position at an angle with relation to the main cam-lever portion, so as to engage the inclined edge 20 of the casting 17, upon which such cam is mounted, and prevent the movement thereof in the direction to release the cutting-wire. By this means it will be readily seen that the movement of the cam to securing position, as shown in Fig. 11, tends to stretch the wire to the necessary tension and that when the cam is in securing position the pivoted lever portion securely holds it in such position and permits it to be readily released when it is desirable to remove a broken wire or to substitute a new one therefor. The pivot-pin 16, which supports the cam, may be provided with an outer head portion at one end and a nut 21 at the other end, adapted to engage the support upon which the cam is mounted, so that the cams may be readily removed and replaced when desired.

In order to provide means for moving the carriage or cutting-table back and forth longitudinally, whereby the return movement of the carriage is accomplished by positively-actuated mechanism and its movement with the clay by the moving column of clay and also whereby the carriage is held in stationary position and automatically released at the desired instant to permit its longitudinal movement with the column of clay during the cutting operation, a shaft 22 is mounted in suitable supporting portions 23, 24, and 25 of a stationary supporting-framework. These supporting members may be in the form of standards and are provided with bearings for supporting such shaft adjacent to the receiving end of the cutting-table. On this shaft is mounted a clay-supporting pulley 26, which is in fixed relation to the shaft and adapted to be rotated by the moving column of clay. The upper surface of this pulley is substantially on the same plane with the receiving end 27 of the cutting-table, which is provided with an antifriction-roll 28, adapted to engage the column of clay as it passes on to the platen mechanism of the cutting-table.

An off-bearing belt-pulley 29 is mounted upon and in fixed relation to a rotatable shaft 30 beyond the discharge end of the cutting table or carriage and is adapted to be connected with a suitable source of power. A friction wheel or disk 31 is mounted upon and in fixed relation to the off-bearing pulley-supporting shaft, and a segmental friction-disk 32 is mounted adjacent to such annular driving friction-disk upon a shaft 33 and operatively connected with the cutting table or carriage by means of a connecting-link 34, which is pivotally connected with the segmental friction-disk by means of a crank-pin 35 and with the cutting table or carriage by means of lugs 36 and a pivot-pin 37. The operating segmental peripheral portion of this segmental friction-disk embraces approximately one-half of its periphery and is so mounted with relation to the annular friction disk or wheel 31 that when the carriage is in initial position the frictional portion of the segmental friction-disk is about to move out of frictional engagement with the friction-pulley by which it is driven, and when the cutting-table rotates to its limit of movement in the direction of its discharging end the said segmental friction-disk will be upon the point of entering into frictional engagement, so as to afford a positive connection between the cutting-table and the source of power which moves the table back to initial position. An off-bearing belt 39 is mounted upon the pulley 31 upon the same plane with the rearwardly-projecting portion 40 of the cutting-table. The pulley-wheel 26, which carries the column of clay, is provided with an annular flange 41, having an inclined outer peripheral surface, and a slot 42, adapted to permit a detent member to pass therethrough in the form of a conical roller 43 upon a flexible arm 44. This flexible arm is secured to the receiving end of the cutting table or carriage by means of bolts 45 or in any ordinary and well-known manner and has a pivot-pin 46, upon which the conical roller is rotatably mounted. This conical roller has a cylindrical peripheral portion which engages the inner cylindrical peripheral surface of the annular flange 41, so as to prevent the movement of the carriage while such parts are in engagement. The arm and its roller are thus adapted to hold the carriage in stationary position and against the action of the moving column of clay as long as the roller is in engagement with the inner cylindrical peripheral surface of the flange or rim 41 of the pulley 26, and these elements are adapted to release the carriage upon the instant that the perforation or releasing-slot 42 registers with the conical wheel.

It will of course be understood that the controlling-arm 44 would operate efficiently with a detent member in the form of a lug or pin similar to the pin 46, adapted to engage the flange of the pulley, and without the interposition of the conical antifriction-roller, although I prefer to employ a roller. The inclined outer periphery of the flange 41 permits the roller 43 to be snapped over the flange and into engagement with the inner cylindrical surface thereof, and the arm 44 is sufficiently resilient to permit this, while at the same time stiff enough to hold the carriage against movement and prevent the disengagement of the arm and pulley or flange until the groove 42 registers with the detent member or roller 43 and releases such detent member.

Figure 1:
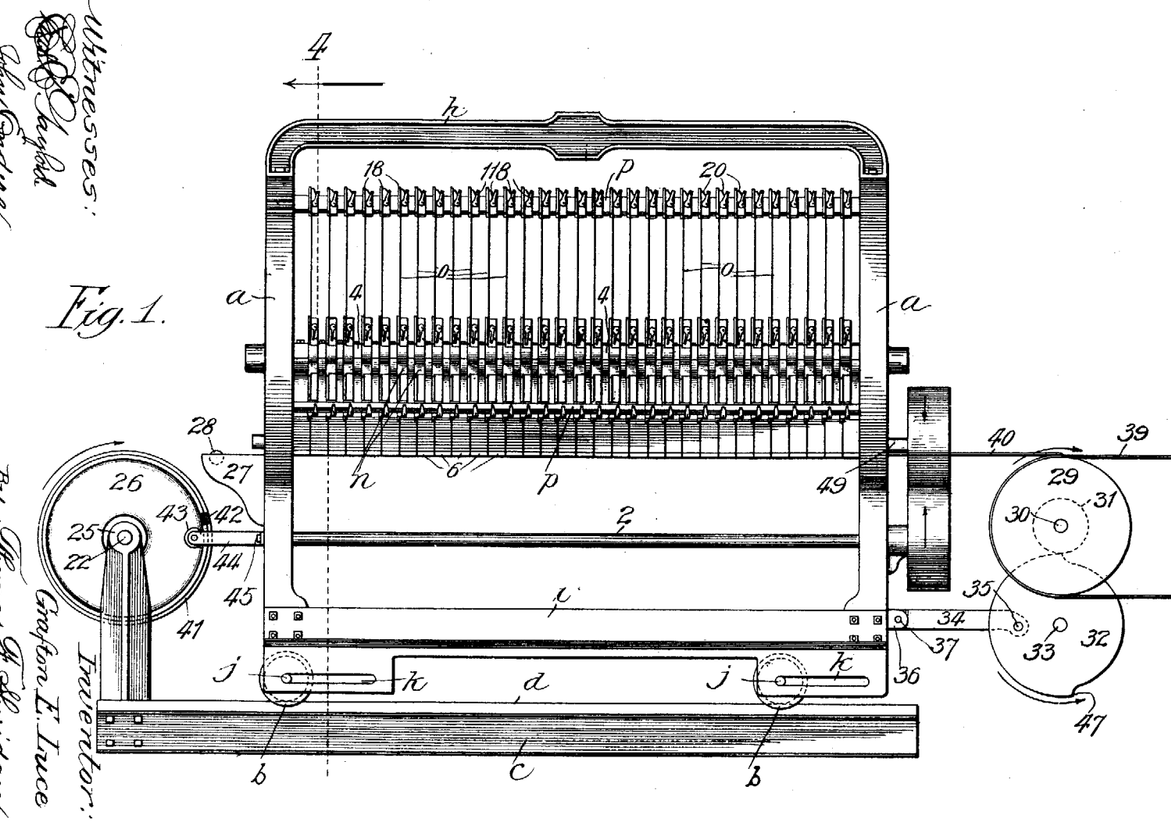
Figure 1 is a side elevation of a portion of a brick-machine constructed in accordance with my improvements, showing my improved cutting-table and its operating mechanism.

In Fig. 1 the table is shown in its stationary position as it appears when the column of clay is being moved on to the platen mechanism thereof, and the roller 26 is shown as it appears when about to release the cutting-table so as to permit it to move with the column of clay, which movement of the table serves to rotate the segmental friction-disk 32 from the position shown in Fig. 1 to position to cause the end portion 47 of its friction-surface to engage the friction member 31 and be thereby returned with the table to initial position.

In order to provide improved means for operating the cutting-reel during the movement of the table, as above suggested, a main driving-pulley 48 is mounted upon and in fixed relation to a telescopic rotatable shaft 49, which extends in parallel relation to the path of movement of the cutting-table. One end of such shaft is rotatably mounted in a bearing 50 and the other relatively movable end portion 51 in a bearing 52, which should move with the cutting-table. The opposite ends of this shaft are so connected as to be moved longitudinally with relation to each other, this being accomplished by providing rigid side link members 53 upon the longitudinally-movable portion of the shaft and integral therewith and side link members 54 upon and integral with the longitudinally-stationary portion thereof. These link members or arm portions of the shaft are mounted in parallel relation, so as to form telescoping arm portions, and the separated ends of each pair are provided with rollers 55, pivotally mounted therebetween upon pivots 56, the peripheral portions of such rollers being between and in engagement with the inner parallel surface portions of the adjacent telescoping arms, as shown in Fig. 7. By this means it will be seen that the shaft is adapted to be extended and collapsed, and it becomes possible to mount a main driving-pulley upon and in fixed relation to a portion of the shaft which is not movable longitudinally and a driven friction-wheel 57 upon and in fixed relation to a portion of the shaft which is movable longitudinally with the cutting table or carriage. This enables the main driving-pulley 48 to be efficiently connected with the main line-shaft and thereby with a suitable source of power. The shafts 49 and 30 may be connected with the same line-shaft, so that the main driving-pulley 48 and the friction-disk 31 upon the shaft 30 are indirectly connected.

Figure 2:
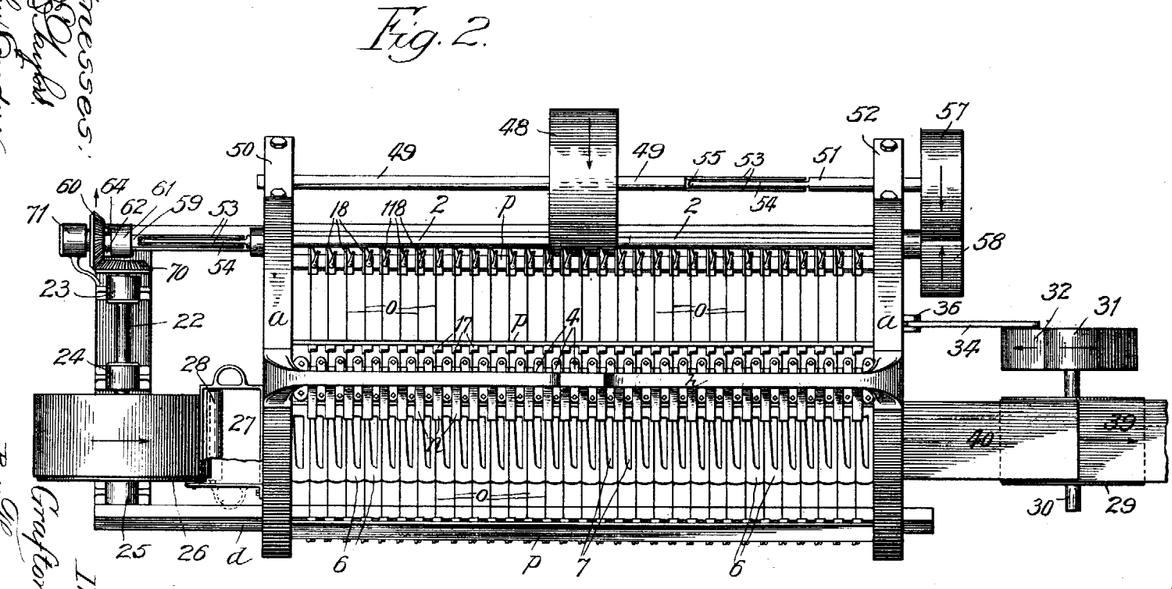
Fig. 2, a plan view of the same.
Figure 3:
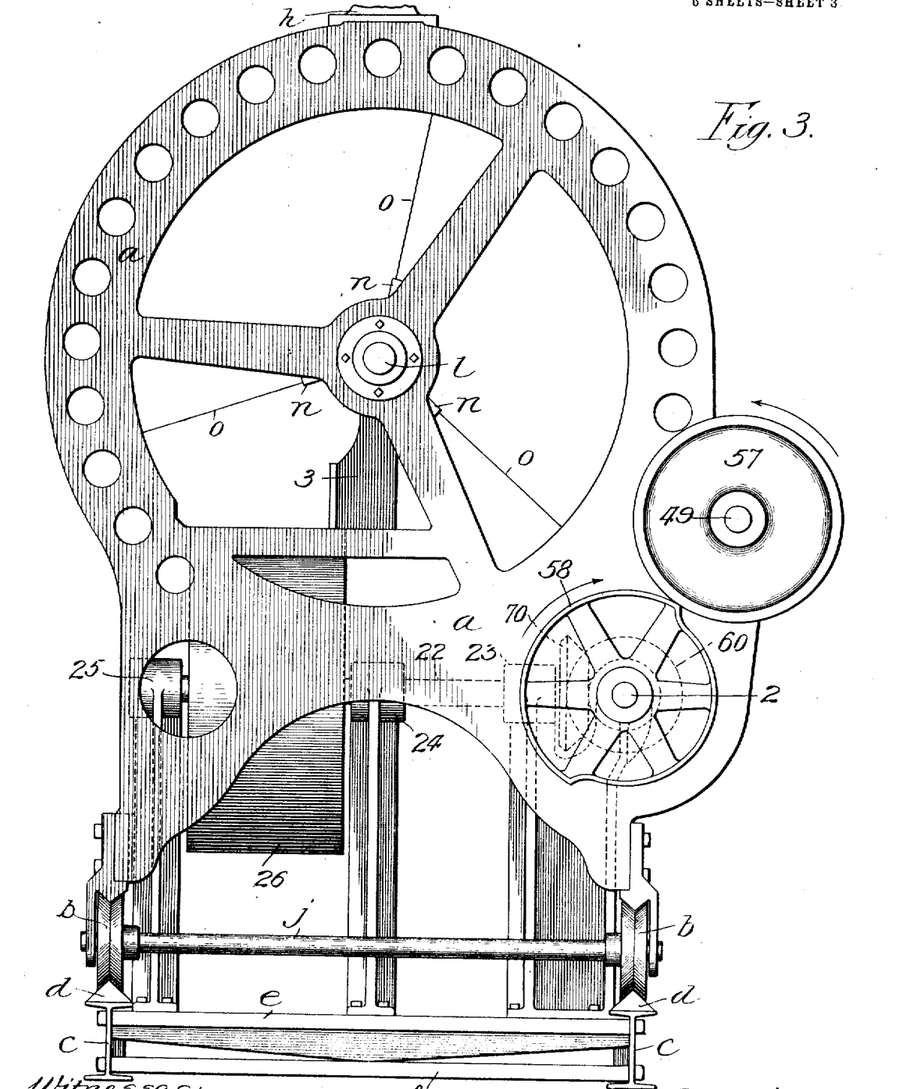
Fig. 3, an end elevation showing the discharging end of the movable cutting table or carriage.
Figures 13, 14, 15:
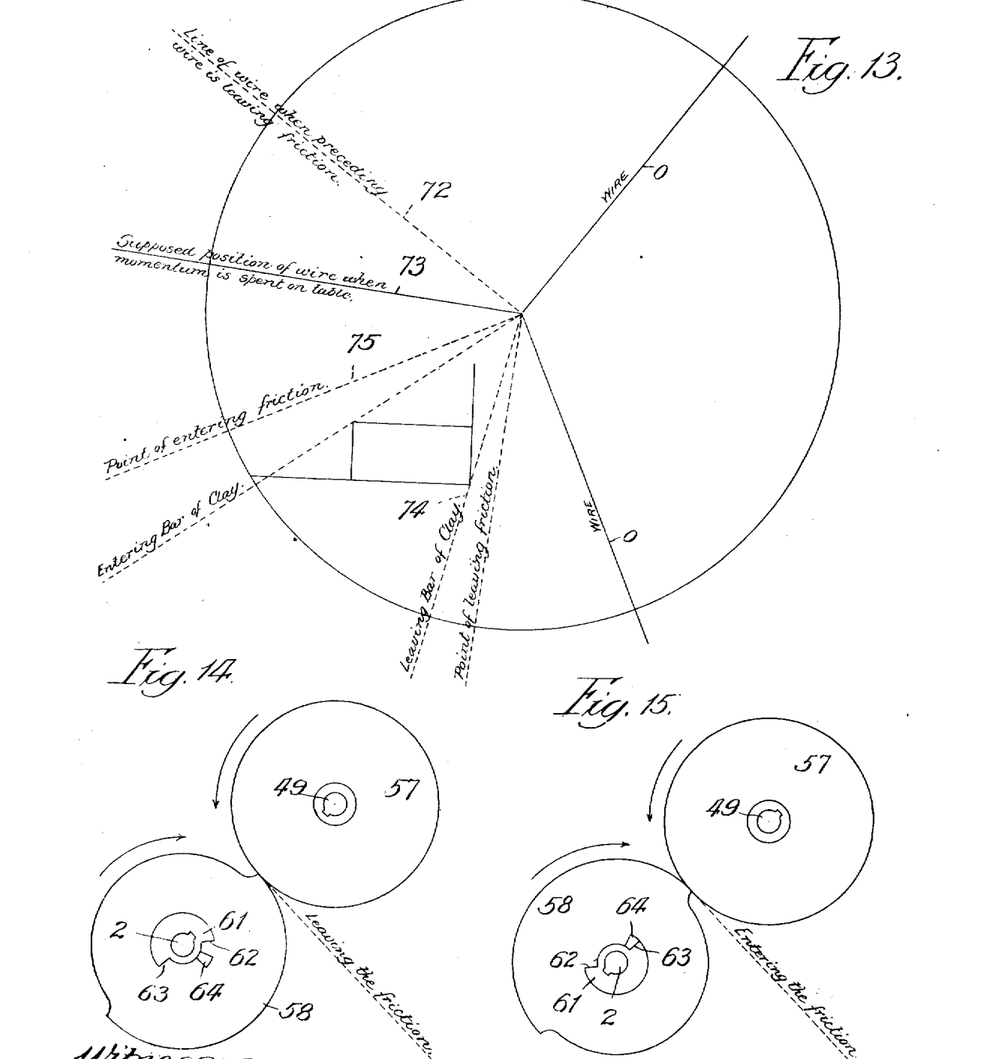

To provide means for automatically connecting the driving-shaft 49 operatively with the shaft 2, and thereby with the cutting-reel, and to enable the cutting-reel to be automatically disconnected from such driving mechanism, so as to enable the reel to be positively actuated during the cutting operation and by means of the moving column of clay while out of cutting engagement with the clay, a segmental friction-disk 58 is mounted upon the end of the shaft 2, which moves longitudinally with the cutting-table. This segmental disk is adapted to engage the friction-surface of the friction-wheel 57 upon the driving-shaft 49 and to be rotated thereby when in such frictional engagement. The opposite end portion 59 of the shaft 2 is provided with a bevel-pinion 60, such pinion being provided with a clutch member in the form of a stud 64 in fixed relation to the pinion and in movable relation to the shaft. Mounted upon and in fixed relation to the end portion 59 of the shaft 2 is a sleeve clutch member 61 in the form of a segment, having shoulders 62 and 63 on opposite sides of the stud 64 of the pinion 60, as indicated in Figs. 2, 14, and 15. The bevel-gear 60 is in toothed engagement with a similar bevel-gear 70, mounted upon and in fixed relation to the rotatable shaft 22, which is adapted to be operated by the moving column of clay, and a supporting-bracket 71, which forms a part of the stationary supporting-frame portion, serves to rotatably support the longitudinal stationary end of the rotatable shaft 2, while the longitudinally-movable end of said shaft is mounted in a suitable bearing in the movable carriage or cutting-table. These relatively movable portions of this shaft 2 are telescopic and are connected in the same manner as the members of the shaft 49, already described. By this arrangement it will be seen that the segmental friction-disk 58 is adapted to be moved through the medium of the shaft 2, gears 60 and 70, clutch members 61 and 64, shaft 22, and clay-supporting pulley 26 by the pressure of the moving column of clay and that the movement of said segmental friction-disk 58 by means of the column of clay continues until the friction segment engages the friction-disk 57, as shown in Fig. 15. When this engagement takes place, the segment and its shaft 2 are positively actuated by the main shaft 49 and its friction-disk 57. The cutting-reel is thus operated positively during such frictional engagement of the friction-segments 58 and friction-disk 57. The cutting-reel is automatically released from its connection with the positively-actuated driving mechanism when such friction mechanisms reach the position shown in Fig. 14. Substantially simultaneously with the movement of these friction mechanisms out of frictional engagement, or immediately thereafter, the segmental friction-disk 32 engages the friction member 31 upon the driven shaft 30, and this frictional engagement causes the friction-segment 32 to be rotated to the position shown in Fig. 1, thus moving the cutting-table back to initial position, where it is held until released by the arm 44 and pulley 26, as already described.

In operation, therefore, the movement of the cutting-reel by the positively-actuated driving mechanisms above described produces sufficient momentum to cause it to rotate when suddenly released a distance corresponding to the distance from the line 72 to the line 73 in Fig. 13. In this figure the line 72 represents the position of a given set of cutting-wires when a preceding set of wires (indicated by the line 74) is leaving the column of clay, and line 73 represents the position to which the set of wires 72 is rotated by the momentum of the cutting-reel when the set of wires 74 leaves the column of clay. When the wires 72 reach the point indicated by the line 73, they are moved from such position to the point indicated by the line 75 by means of the moving column of clay. From the point indicated by line 75 to the line 74 the said set of wires is positively actuated, cutting through the column of clay to the position indicated by line 74. This positive rotation of the cutting-reel is accomplished by means of the main driving-pulley 48 and the friction members 57 and 58, the shaft 2, with its clutch members, and the operating-gear 76 upon said shaft, which is in toothed engagement with the toothed end member of the cutting-reel, as shown in Fig. 4. In other words, the cutting-reel is rotated by means of such positively-actuated shaft and friction-gear mechanisms while in cutting engagement with the column of clay, and when its momentum is expended it is rotated to the point of entering frictional engagement by means of the movement of the column of clay. The arrangement of the clutch members 61 and 64 permits the movement of the shafts 2 and 49 at different rates of speed when not connected by their respective friction-gear members and causes frictional engagement between the segmental disk 58 and the annular friction-disk 57 to take place and such members to be released at the proper time to enable the purposes above mentioned to be accomplished.

I claim—

1. In a brick-machine, the combination of a movable carriage, a rotary cutting-reel mounted thereon and provided with a multiplicity of cutting-wires, a plurality of clay-supporting platen-sections forming spaces therebetween for receiving the cutter-wires and each having a slot in its clay-supporting surface for reducing the friction between the clay and such platens, driving mechanism operatively connected with such cutting-reel for rotating it while in cutting engagement with the column of clay, and mechanism for connecting such cutting-reel-driving mechanism with the cutting-reel and automatically disconnecting it therefrom.

2. In a brick-machine, the combination of a movable carriage, a cutting-reel rotatably mounted thereon, a driving-shaft adapted to be positively actuated and provided with a friction-wheel, a shaft mounted upon such carriage provided with a segmental friction-disk movable into and out of engagement with the friction-wheel upon such driving-shaft, and means for operatively connecting the shaft upon which such segmental friction-disk is mounted with the cutting-reel.

3. In a brick-machine, the combination of a movable carriage, a cutting-reel rotatably mounted thereon, a driving-shaft adapted to be positively actuated and provided with a friction-wheel, a shaft mounted upon such carriage provided with a segmental friction-disk movable into and out of engagement with the friction-wheel upon such driving-shaft, gear mechanism mounted upon the cutting-reel, and gear mechanism mounted upon the shaft upon which such segmental friction-disk is mounted and in engagement with the gear mechanism of the cutting-reel.

4. In a brick-machine, the combination of a movable carriage, a cutting-reel rotatably mounted thereon, a main cutter-driving shaft adapted to be positively actuated and provided with a friction-wheel, a shaft mounted upon such carriage provided with a segmental friction-disk movable into and out of engagement with the friction-wheel upon the driving-shaft, gear mechanism mounted upon the cutting-reel, gear mechanism mounted upon the shaft upon which such segmental friction-disk is mounted and in engagement with the gear mechanism of the cutting-reel, and mechanism operatively connected with the shaft upon which such segmental friction-disk is mounted and adapted to be operated by a moving column of clay for rotating the segmental friction-disk into and out of engagement with the friction-wheel upon the main driving-shaft.

5. In a brick-machine, the combination of a movable carriage, a rotary cutter mounted thereon and movable therewith, a main driving-shaft adapted to be positively actuated and provided with a friction-wheel, a shaft operatively connected with the rotary cutter and provided with a segmental friction-disk movable into and out of frictional engagement with such friction-wheel, and mechanism operatively connected with the shaft upon which such segmental friction-disk is mounted and adapted to be operated by a moving column of clay for rotating the cutter while out of cutting engagement with the clay and operatively connecting the positively-actuated driving-shaft with the cutter.

6. In a brick-machine, the combination of a movable carriage, a rotary cutter mounted thereon and movable therewith, a main driving-shaft adapted to be positively actuated and provided with a friction-wheel, a shaft operatively connected with the rotary cutter and provided with a segmental friction-disk movable into and out of frictional engagement with such friction-wheel, mechanism operatively connected with the shaft upon which such segmental friction-wheel is mounted and adapted to be operated by a moving column of clay for rotating the cutter while out of cutting engagement with the clay and operatively connecting the positively-actuated driving-shaft with the cutter, mechanism adapted to be operated by the moving column of clay for automatically releasing the carriage, and means for returning the carriage to initial position.

7. In a brick-machine, the combination of a movable carriage, a rotary cutter mounted thereon and movable therewith, a main driving-shaft adapted to be positively actuated and provided with a friction-wheel, a shaft operatively connected with the rotary cutter and provided with a segmental friction-disk movable into and out of frictional engagement with the friction-wheel, mechanism operatively connected with the shaft upon which the segmental friction-wheel is mounted and adapted to be operated by a moving column of clay for rotating the cutter while out of cutting engagement with the clay and operatively connecting the positively-actuated driving-shaft with the cutter, means for holding the carriage in stationary position, mechanism adapted to be operated by the moving column of clay for automatically releasing the carriage, a shaft provided with a friction-wheel adapted to be connected with the carriage for returning it to initial position, and a segmental friction-disk operatively connected with the carriage and movable into and out of engagement with the friction-wheel for operatively connecting the carriage-operating friction-wheel with the carriage and disconnecting it therefrom.

8. In a brick-machine, the combination of a movable carriage, a rotary cutter mounted thereon and movable therewith, a main cutter-driving shaft adapted to be positively actuated and provided with a gear-wheel, a shaft operatively connected with the rotary cutter and provided with a gear member movable into and out of engagement with such gear-wheel of the main cutter-driving shaft, actuating gear mechanism loosely mounted upon such shaft, and clutch mechanism operatively connecting such actuating gear mechanism and shaft and adapted to permit limited independent rotatable movements thereof.

9. In a brick-machine, the combination of a movable carriage, a rotary cutter mounted thereon and movable therewith, a main driving-shaft adapted to be positively actuated and provided with a friction-wheel, a shaft operatively connected with the rotary cutter and provided with a segmental friction-disk movable into and out of frictional engagement with such friction-wheel, shaft and gear mechanism adapted to be operated by the moving column of clay, and clutch mechanism for connecting the shaft and gear mechanism with the shaft upon which the segmental friction-disk is mounted adapted to permit limited independent movements of the gear mechanism and shaft with relation to each other.

10. In a brick-machine, the combination of a movable carriage, a rotary cutter mounted thereon and movable therewith, a main driving-shaft adapted to be positively actuated and provided with a gear-wheel, an extensible and collapsible shaft operatively connected with the rotary cutter and provided with a segmental gear member movable into and out of engagement with such gear-wheel, and mechanism operatively connected with the extensible and collapsible shaft upon which such segmental gear member is mounted for rotating the cutter while out of cutting engagement with the clay and operatively connecting the positively-actuated driving-shaft with the cutter.

11. In a brick-machine, the combination of a movable carriage, a cutter mounted thereon, a telescopic main driving-shaft having a main driving-pulley mounted upon one portion thereof and a friction-wheel mounted upon a longitudinally-movable portion thereof, a shaft operatively connected with the cutter and provided with a longitudinally-movable portion having a segmental friction-disk mounted thereon and movable into and out of engagement with the friction-wheel upon such driving-shaft, and means for rotating the shaft upon which such segmental friction-disk is mounted.

12. In a brick-machine, the combination of a movable carriage, a cutter mounted thereon, a telescopic main driving-shaft having a main driving-pulley mounted upon one portion thereof and a friction-wheel mounted upon a longitudinally-movable portion thereof, a shaft operatively connected with the cutter and provided with a longitudinally-movable portion having a segmental friction-disk mounted thereon and movable into and out of engagement with the friction-wheel upon such driving-shaft, means for rotating the shaft upon which the segmental friction-disk is mounted, consisting of a shaft and gear mechanism connected with the shaft upon which the segmental friction-disk is mounted and adapted to be operated by the moving column of clay.

13. In a brick-machine, the combination of a movable carriage, a cutter mounted thereon, a driving-shaft adapted to be positively actuated and provided with a friction-wheel, a shaft provided with a segmental friction-disk movable into and out of frictional engagement with such friction-wheel, a clutch-sleeve mounted upon and rotatable with the shaft upon which such segmental friction-disk is mounted, a pinion mounted upon such shaft and provided with a stud movable into and out of engagement with the sleeve clutch member, and means for rotating the pinion upon which such stud is mounted.

14. In a brick-machine, the combination of a movable cutting-table provided with detent mechanism, and a wheel having an annular inner surface portion for engaging such detent mechanism and provided with means for releasing the detent mechanism and thereby the cutting-table.

15. In a brick-machine, the combination of a movable cutting-table provided with detent mechanism, a wheel adapted to be operated by a moving column of clay having an annular flange or rim for engaging such detent-arm mechanism and provided with means for automatically releasing the detent-arm mechanism and thereby the cutting-table, and means for returning the cutting-table to initial position.

16. In a brick-machine, the combination of a movable cutting-table provided with detent mechanism, and a wheel provided with an annular flange or rim portion in engagement with such detent mechanism and having a recess for releasing the detent mechanism and thereby permitting the table to move the column of clay.

17. In a brick-machine, the combination of a movable cutting-table, a wheel adapted to be operated by a moving column of clay and provided with an annular flange having an inclined outer surface portion and an inner surface portion extending parallel with the axis of the wheel, and a detent member secured to the cutting-table and provided with means for yieldingly holding it in position to slide over the inclined surface portion of such flange into engagement with the inner annular surface portion thereof.

18. In a brick-machine, the combination of a cutter-frame provided with cutter-wires, securing cam mechanism mounted in engagement with the end portions of each of such cutter-wires for stretching and holding them in operative position, and lever-arms for such cams provided with means for securing them against movement in a releasing direction.

19. In a brick-machine, the combination of a cutter-frame provided with cutter-wires, securing cam mechanism mounted in engagement with the end portions of each of such cutter-wires for stretching and holding them in operative position, lever-arms for such cams, and a securing-dog pivotally mounted upon each of such lever-arms for securing them against movement in a releasing direction.

20. In a brick-machine, the combination of a plurality of platen-sections forming spaces therebetween, each being provided with an upper clay-supporting surface, and a slot having inclined side walls merging into such clay-supporting surface portion.

21. In a brick-machine, the combination of a plurality of platen-sections forming spaces therebetween, each being provided with an upper clay-supporting surface, a slot having inclined side walls merging into such clay-supporting surface portion, means for supporting such platen-sections in operative position, and a cutter provided with a plurality of wires movable between the platen-sections.

22. In a brick-machine, the combination of a plurality of platen-sections forming spaces therebetween, each being provided with an upper clay-supporting surface, a slot having inclined side walls merging into such clay-supporting surface portion, a rotary cutter provided with a plurality of wires movable between such platen-sections, and a reciprocating carriage upon which such rotatable cutter and platens are mounted.

GRAFTON E. LUCE.

Witnesses:
HARRY I. CROMER,
FRANK B. LAMBERT.